US008954800B1

(12) United States Patent
Spangler et al.

(10) Patent No.: US 8,954,800 B1
(45) Date of Patent: Feb. 10, 2015

(54) RECOVERY BUTTON FOR AUTOMATICALLY ENTERING RECOVERY MODE

(75) Inventors: Randall R. Spangler, San Jose, CA (US); Christopher Thomas Lyon, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 405 days.

(21) Appl. No.: 13/414,654

(22) Filed: Mar. 7, 2012

(51) Int. Cl.
*G06F 11/00* (2006.01)
(52) U.S. Cl.
USPC .............................. 714/23; 714/24
(58) Field of Classification Search
None
See application file for complete search history.

(56) References Cited

U.S. PATENT DOCUMENTS

| | | | |
|---|---|---|---|
| 2002/0162052 A1 | 10/2002 | Lewis | |
| 2004/0015941 A1* | 1/2004 | Sekine | 717/168 |
| 2004/0172578 A1 | 9/2004 | Chen et al. | |
| 2006/0150037 A1 | 7/2006 | Wang | |
| 2007/0055970 A1* | 3/2007 | Sakuda et al. | 717/168 |
| 2007/0236734 A1* | 10/2007 | Okamoto | 358/1.16 |
| 2009/0241103 A1* | 9/2009 | Pennisi et al. | 717/173 |
| 2011/0087920 A1 | 4/2011 | Hendricks et al. | |
| 2012/0272084 A1* | 10/2012 | Tsuji | 713/324 |

OTHER PUBLICATIONS

Grabianowski, "Top 5 Ways to Troubleshoot Your Broadband Internet Connection", May 11, 2009 [https://web.archive.org/web/20090511024934/http://electronics.howstuffworks.com/how-to-tech/5-ways-to-troubleshoot-broadband-connection2.htm].*
"Restore Your Broken iPhone With Recovery Mode" retrieved from <http://www.iphonealley.com/tips/save-your-iphone-with-recovery-mode> Aug. 17, 2007, 8 pgs.
"Cr-48 Chrome Notebook Developer Information" retrieved from <http://www.chromium.org/chromium-os/developer-information-for-chrome-os-devices/cr-48-chrome-notebook-developer-infromation> retrieved on May 30, 2012, 7 pgs.

* cited by examiner

*Primary Examiner* — Gabriel Chu
(74) *Attorney, Agent, or Firm* — McDermott Will & Emery LLP

(57) ABSTRACT

Systems, methods, and machine-readable media for initiating a recovery mode to execute a recovery mode procedure is discussed. The system may include a main processor, an embedded controller, timer circuitry, and recovery circuitry. The recovery circuitry may be configured to receive an indication to execute a recovery mode procedure and, in response to receiving the indication to execute the recovery mode procedure, to trigger a first time period and a second time period. The timer circuitry may be configured to shut off the embedded controller for the first time period, wherein when the first time period expires, the embedded controller is further configured to boot from embedded controller recovery code and shut off the main processor for the second time period, wherein when the second time period expires, the main processor may be configured to boot from main processor recovery code and execute the recovery mode procedure.

20 Claims, 4 Drawing Sheets

300

RECOVERY BUTTON FOR AUTOMATICALLY ENTERING RECOVERY MODE

BACKGROUND

The present disclosure generally relates to the recovery of computer systems and, in particular, to entering a recover mode.

Computing devices (e.g., desktop computers, laptops, tablets, smart phones, mobile devices, servers, etc.) generally operate using a combination of firmware and software that is configured to execute on the hardware of a particular computing device. The set of firmware and software (e.g., the operating system) that is used to operate the computing device may be referred to as an operating image for the computing device.

Various situations may occur where it is desired to replace or repair an operating image being used by a computing device. For example, a user may wish to update or repair the computing device's operating system, main processor firmware, or embedded controller (EC) firmware. To repair the operating image, it may be necessary for the computing device to enter a recovery mode, during which the operating image may be repaired or replace using a recovery image (e.g., a set of firmware and software that can be used to replace or repair the computing device's operating image).

SUMMARY

According to one aspect of the subject technology, a system for initiating a recovery mode to execute a recovery mode procedure is provided. The system may include a main processor, an embedded controller, timer circuitry, and recovery circuitry. The recovery circuitry may be configured to receive an indication to execute a recovery mode procedure and, in response to receiving the indication to execute the recovery mode procedure, to trigger a first time period and a second time period. The timer circuitry may be configured to shut off the embedded controller for the first time period, wherein when the first time period expires, the embedded controller is further configured to boot from embedded controller recovery code and shut off the main processor for the second time period, wherein when the second time period expires, the main processor may be configured to boot from main processor recovery code and execute the recovery mode procedure.

The timer circuitry may be configured to shut off the embedded controller for a first time period, wherein when the first time period expires, the embedded controller is further configured to boot from embedded controller recovery code. The timer circuitry may also be configured to shut off the main processor for a second time period, wherein when the second time period expires, the main processor may be configured to boot from main processor recover code and execute the recovery mode procedure. The recovery circuitry may be configured to receive an indication to execute the recovery mode procedure and, in response to receiving the indication to execute the recovery mode procedure, to trigger the first time period and the second time period.

According to another aspect of the subject technology, a method for initiating a recovery mode to execute a recovery mode procedure is provided. The method may include receiving a signal to execute a recovery mode procedure and shutting off an embedded controller for a first time period and a main processor for a second time period in response to receiving the signal. The method may further include booting up the embedded controller from embedded controller recovery code at the end of the first time period, booting up the main processor from main processor recovery code at the end of the second time period, and executing the recovery mode procedure.

According to yet another aspect of the subject technology, a machine-readable medium including instructions stored therein, which when executed by a machine, cause the machine to perform operations for initiating a recovery mode to execute a recovery mode procedure is provided. The operations may include receiving an indication to execute a recovery mode procedure, shutting off an embedded controller for a first time period and a main processor for a second time period in response to receiving the indication, booting up the embedded controller from embedded controller recovery code at the end of the first time period, booting up the main processor from main processor recovery code at the end of the second time period, and executing the recovery mode procedure.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

Figure 1:
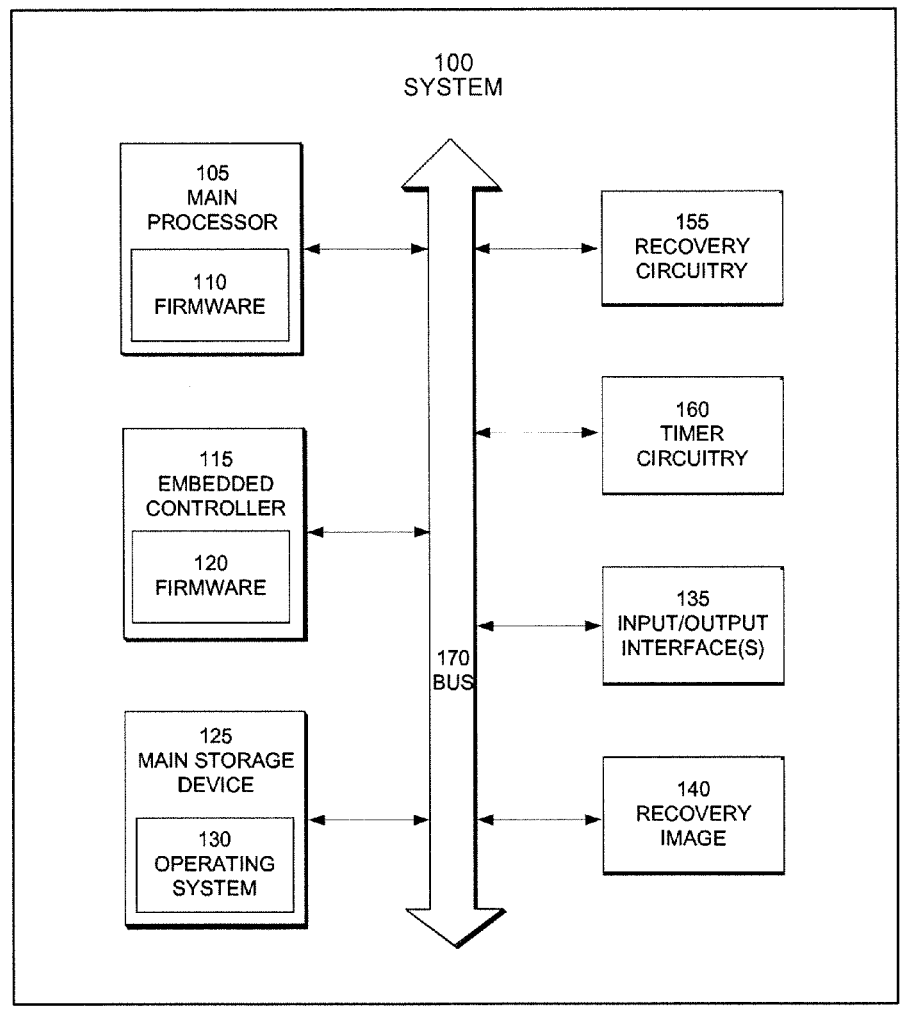
FIG. 1 is a block diagram illustrating a computer system for entering a recovery mode, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Correctly entering into a recovery mode may be a complex and difficult process for some users. Different steps may need to be taken in a particular order depending on which portion of the operating image (e.g., the main processor firmware, the embedded controller firmware, or the operating system) is to be repaired or replaced. For example, a system's operating system may, in some cases, have a feature that enables a user to restart the system into a recovery mode that can repair or replace the system's operating system (OS).

In other cases, however, the steps needed to enter into a recovery mode may be much different. For example, unlike the main processor, the embedded controller may remain powered and running while the system is "off" in order to continue to perform tasks related to, for example starting a computing system, stopping a computing system, or tasks that may be run while a system (e.g., a laptop) is "off," such as controlling battery charging operations. However, in order to alter the firmware on the embedded controller, the embedded controller must be turned off and restarted in a recovery mode.

Accordingly, to replace or repair the embedded controller firmware, a user may need to shut down the operating environment of the device and completely cut off power to the device (e.g., by unplugging the laptop and removing any batteries). After cutting off power to the device, the user may need to wait for a period of time before plugging the device back in and press the power button to turn on the system. After turning on the system, the user may initiate a recovery mode via a key stroke during a particular window of time during the boot-up of the device.

In some cases, the computing device may have a recovery button that may be used to enter a recover mode. However, the steps needed to enter into a recovery mode may also be complex and confusing. For example, the user may need to shut down the device, completely cut off power to the device, wait for a period of time, plug the device back in, hold down the recovery button, press the power button, and release the recovery button after the system begins recovery mode operations.

According to some aspects of the subject technology, a recovery button on a system may be configured to initiate a recovery mode for the system. The recovery button may initiate a recovery mode that may allow the user to repair, replace, or update various portions of the operating image (e.g., the operating system, the main processor firmware, the embedded controller firmware, etc.).

FIG. 1 is a block diagram illustrating a computer system 100 for entering a recovery mode, in accordance with various aspects of the subject technology. The system 100 may include, among other things, a main processor 105, one or more embedded controllers 120, a main storage device 125, recovery circuitry 155 (e.g., a recovery button), timer circuitry 160, and one or more input/output interfaces 135 connected via a bus 170.

The system may also include an operating image that includes portions of main processor firmware 110 located on the main processor 105, portions of embedded controller firmware 120 for the embedded controller 115, and an operating system 130 that may be stored on the main storage device 125. The portions of the embedded controller firmware 120 (e.g., read-writable firmware on the embedded controller 115) and the main processor firmware 110 (e.g., read-writable firmware on the main processor 105) that are part of the operating image may be used to operate the embedded controller 115 and the main processor 105 during normal conditions.

In some cases, however, in order to update, repair, or otherwise alter the firmware on the embedded controller 115 or on the main processor 105, the embedded controller 115 or the main processor 105 must be rebooted to run on recovery code (e.g., read-only portions of firmware on the embedded controller 115 and on the main processor 105) in a recovery mode.

During recovery mode, the operating image may be updated, repaired, or replaced using a recovery image 140 that may be stored on the main storage device 125, a secondary storage device, or an external storage device accessible through an interface (e.g., a network interface, an external hard drive interface, etc.). More specifically, the recovery image 140 may include recovery code such as a partition table, a recovery kernel, and a recovery root file system for use as an operating environment during a recovery mode. The recovery image 140 may also include a device kernel, a device root file system, and firmware for the system that may be used during the recovery mode to update, repair, or replace the operating image of the system.

The recovery circuitry 155, a button or switch for example, may be configured to 1) set a recovery flag or signal if one has not already been set by the operating system 130, 2) cut power to the system 400 (including the embedded controller and the main processor), and 3) trigger timer circuitry 160 configured to restart the system 400 into recovery mode.

In one aspect, the timer circuitry 160 may include two timer circuits. The first timer circuit may be configured to reset the embedded controller or cut power to the embedded controller for a first period of time. The first time period may be long enough such that the embedded controller and the main processor are able to completely shut down.

When the period of time measured by the first timer circuit expires, the embedded controller 115 may be configured to power up and initialize. During the initialization processes, the embedded controller 115 may detect that the system is to run a recovery mode (e.g., by detecting a recovery flag or signal) and boot-up in recovery mode so that the writable portions of the embedded controller firmware 120 may be repaired or replaced.

The second timer circuit may be configured to cause the main processor 105 to power up and boot-up at the end of a second period of time. For example, when the second period of time measured by the second timer circuit expires, the main processor 105 may turn on, detect that the system is to run in recovery mode (e.g., by detecting the recovery flag or signal), and enter recovery mode.

When the main processor 105 is running in recovery mode, the system may repair or replace the main processor firmware 110, the writable portions of the embedded controller firmware 120, or the operating system 130 on the main storage device 125 using the recovery image 140.

After recovery is complete, the main processor 105 may signal to the embedded controller 115 to reboot in normal mode. The embedded controller 115 may then reboot into normal mode (thereby turning off the main processor 105 when the embedded controller 115 reboots) and power the main processor 105 back on so that the main processor 105 may boot up in normal mode.

By controlling the power to the main processor 105 as well as the embedded controller 115, the system 100 may be able to repair problems with the main processor firmware 110, problems with the operating system 130, as well as problems with the firmware 120 for the embedded controller without a user having to perform a number of steps in a particular order. The system 100 may further be able to enter into a recovery mode when the system 100 is completely powered off or operating in an unresponsive state.

In one aspect, the embedded controller 115 may be configured to control the power supply to the main processor 105. Accordingly, by shutting off power to the embedded controller 115, the main processor 105 may also be deprived of power. In another aspect, however, the power supply to the main processor 105 may be independent from the power supply to the embedded controller 115 and a separate mechanism controlled by the timer circuitry 160 may be needed to shut off power to the main processor 105.

In accordance with another aspect, the main processor may be an reduced instruction set computing (RISC) processor (e.g., an ARM processor) that is capable of sequencing its own power. In some aspects, the RISC processor may also control the power to an embedded controller. In such systems, the timer circuitry may be configured to cut power to the main processor for a period of time, which in turn would also cut off power to the embedded controller.

Figure 2:
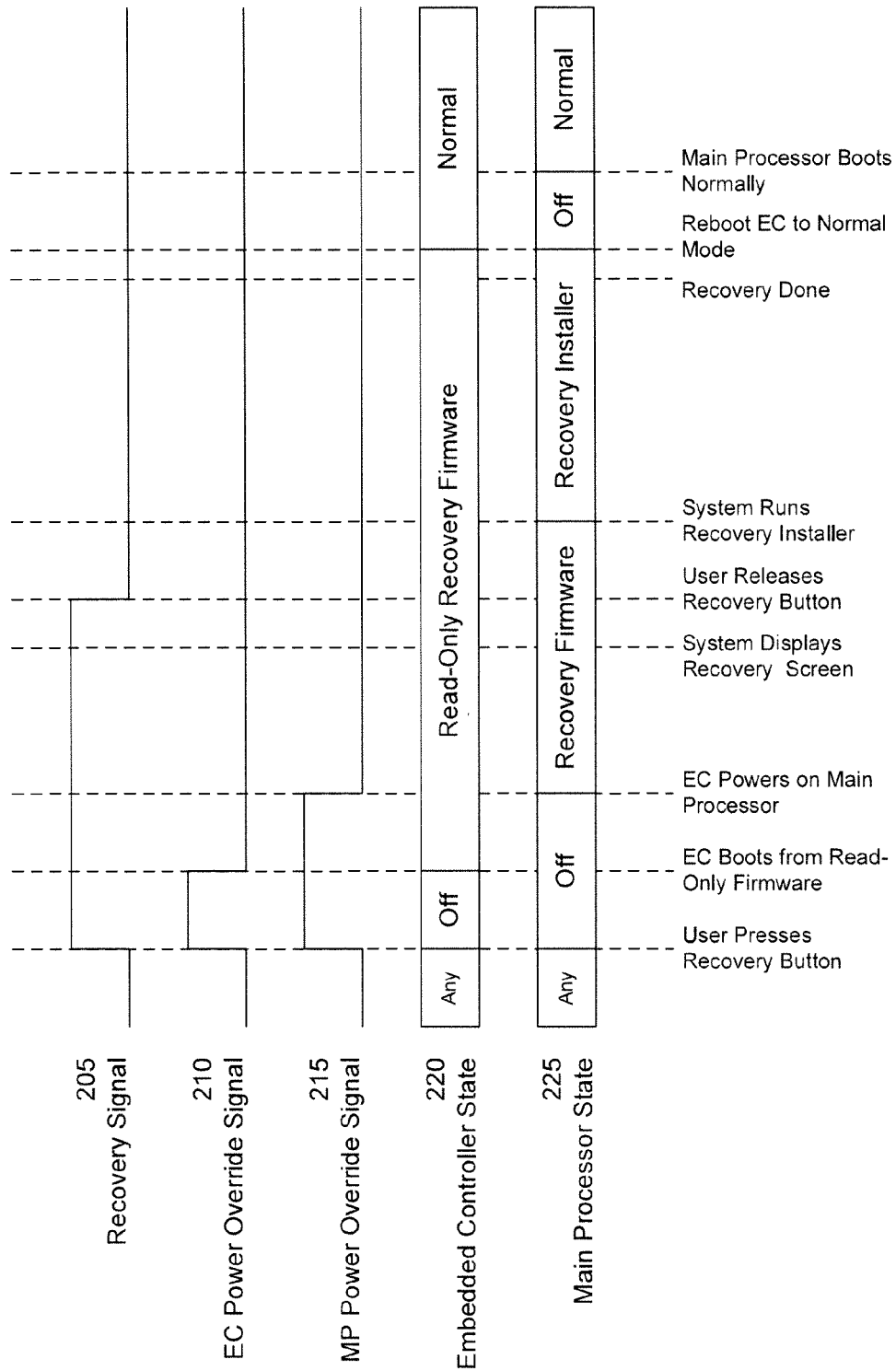
FIG. 2 is a timing diagram illustrating a recovery of a system using a recovery button, in accordance with one aspect of the subject technology.

FIG. 2 is a timing diagram 200 illustrating a recovery of a system using a recovery button, in accordance with one aspect of the subject technology. The timing diagram 200 shows, over time, the state of a recovery signal 205, a embedded controller (EC) power override signal 210, and a main processor (MP) power override signal 215 as well as an embedded controller (EC) state 220 and a main processor state 225.

The recovery signal 205 may be initiated to an "on" state when a user activates the recovery circuitry. For example, in FIG. 2, the recovery signal 205 may turn on when a user presses the recovery button and turn off when the user releases the recovery button. The recovery signal may be configured to activate the timer circuitry which shut off both the embedded controller and the main processor so that both may enter recovery mode.

In one aspect, the timer circuitry may activate the EC power override signal 210 for a period of time. The EC power override signal 210 may be configured to shut off the embedded controller (e.g., put the embedded controller state 220 into an "off" state regardless of what state the embedded controller was in previously). At the end of the period of time, the EC power override signal 210 may turn off and cause the embedded controller to power on and boot up. While booting up, the embedded controller may determine that a recovery mode is to be run (e.g., based on a recovery flag or the recovery signal 205) and boot in recovery mode (e.g., from read-only recovery firmware on the embedded controller).

The timer circuitry may also activate the main processor (MP) power override signal 215. The MP power override signal 215 may be configured shut off the main processor for a another period of time. At the end of the period of time, the MP power override signal 215 may turn off and cause the main processor to power on, detect that a recovery mode should be run (e.g., based on a recovery flag or the recovery signal 205) and boot in recovery mode.

In one aspect, once recovery mode has begun, the system may display a recovery interface (e.g., on a display screen) to the user that signals to the user that the system is in recovery mode and, accordingly, the user can release the recovery button which will set the recovery signal 205 to an "off" state. During recovery mode, the system may run the recovery installer or other recovery code (e.g., from the recovery image) to repair, replace, or update one or more portions of the operating image. Once the recovery is done, the embedded controller and the main processor are rebooted into normal mode.

Figure 3:
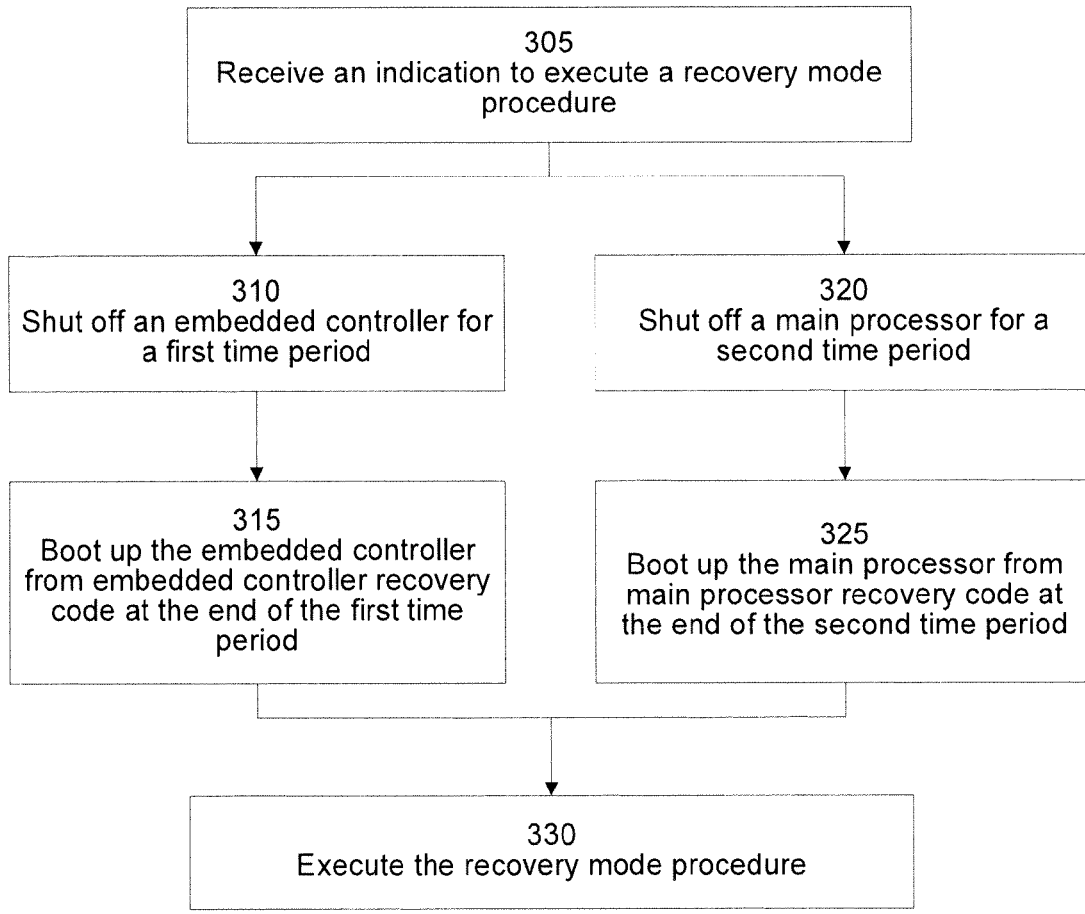
FIG. 3 is a flow chart illustrating a process for automatically entering a recovery mode using a recovery button, in accordance with various aspects of the subject technology.

FIG. 3 is a flow chart illustrating a process 300 for automatically entering a recovery mode using a recovery button, in accordance with various aspects of the subject technology. Although the various operations shown in FIG. 3 appear in a particular order, the operations may occur in other orderings or at the same time.

At operation 305, recovery circuitry 155 may receive an indication to execute a recovery mode procedure. The indication may be for example, the activation of a recovery button or recovery switch by the user. Once the indication is received, timer circuitry 160 may be configured to shut off an embedded controller 115 for a first time period at operation 310 and shut off a main processor 105 for a second time period at operation 320.

At the end of the first time period (e.g., at operation 315), the timer circuitry 160 may allow the embedded controller 115 to boot up, detect that an indication to execute a recovery mode procedure has been asserted, and run embedded controller recovery code (e.g., read-only recovery firmware on the embedded controller). At the end of the second time period (e.g., at operation 325), the timer circuitry 160 may allow the main processor 105 to boot up, detect that an indication to execute a recovery mode procedure has been asserted, and run main processor recovery code. According to one aspect, the timer circuitry 160 may control the shut off and rebooting of the embedded control 115 and the main processor 105 using one or more signals (e.g., EC power override signal 210 and MP power override signal 215 of FIG. 2).

After both the main processor 105 and the embedded controller 115 are rebooted in recovery mode, the system may be able to execute one or more recovery mode procedures at operation 330. The recovery mode procedures may include, for example, updating, repairing, or replacing portions of the system's operating image (e.g., the operating system, writable portions of the firmware for the main processor, writable portions of the firmware for the embedded controller, etc.). When the recovery mode procedures are completed, the system may reboot in normal mode.

Figure 4:
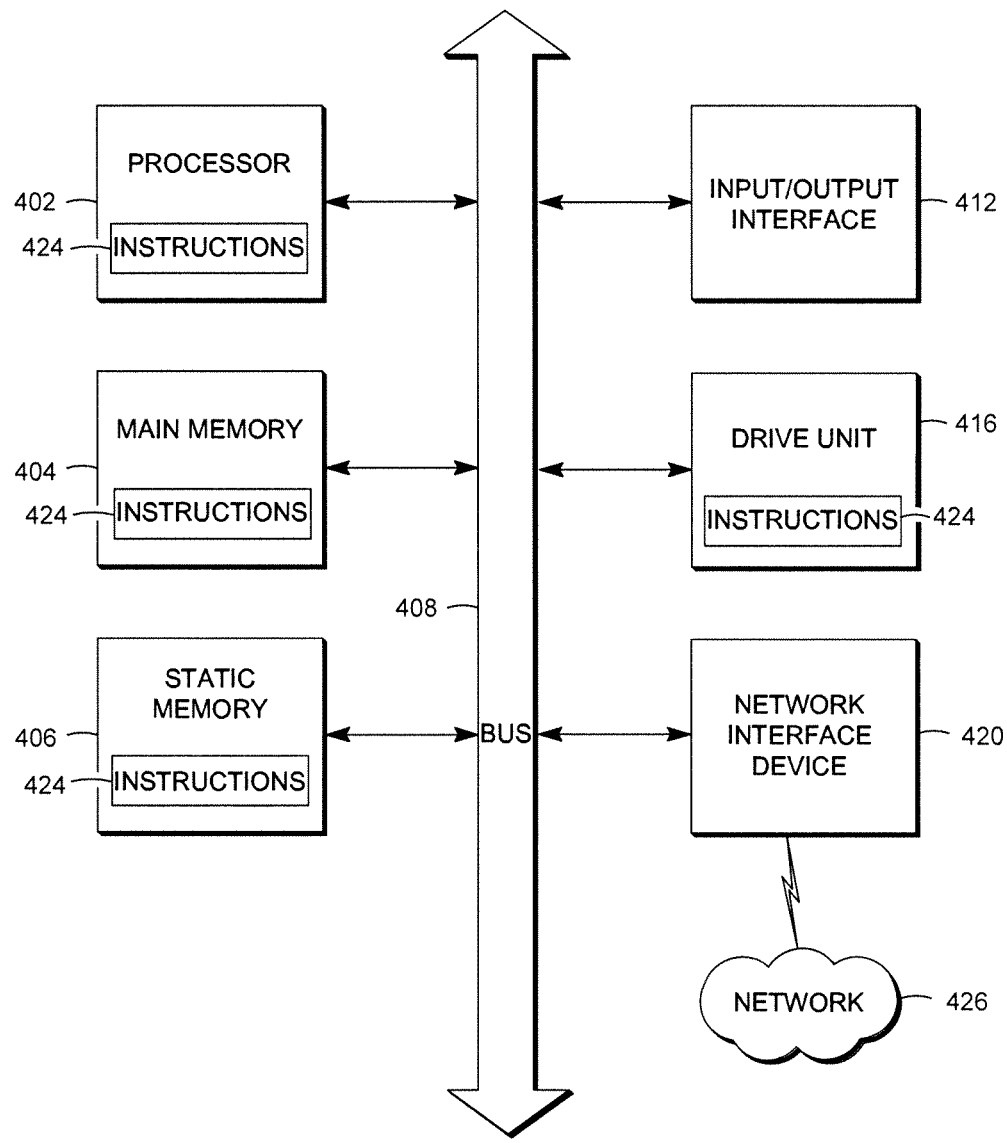
FIG. 4 is a block diagram illustrating a computer system with which any of the aspects described herein may be implemented.

FIG. 4 is a block diagram illustrating a computer system with which any of the aspects described herein may be implemented. In certain aspects, the computer system 400 may be implemented using hardware or a combination of software and hardware, either in a dedicated server, or integrated into another entity, or distributed across multiple entities.

The example computer system 400 includes a processor 402, a main memory 404, a static memory 406, a disk drive unit 416, and a network interface device 420 which communicate with each other via a bus 408. The computer system 400 may further include an input/output interface 412 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 402 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 424 embodying any one or more of the methodologies or functions described herein. The instructions 424 may also reside, completely or at least partially, within the main memory 404 and/or within the processor 402 during execution thereof by the computer system 400, with the main memory 404 and the processor 402 also constituting machine-readable media. The instructions 424 may further be transmitted or received over a network 426 via the network interface device 420.

The machine-readable medium may be a single medium or multiple media (e.g., a centralized or distributed database, and/or associated caches and servers) that store the one or more sets of instructions. The machine-readable medium may include the drive unit 416, the static memory 406, the main memory 404, the processor 402, an external memory connected to the input/output interface 412, or some other memory. The term "machine-readable medium" shall also be taken to include any non-transitory medium that is capable of storing, encoding or carrying a set of instructions for execution by the machine and that cause the machine to perform any one or more of the methodologies of the aspects discussed herein. The term "machine-readable medium" shall accordingly be taken to include, but not be limited to, storage mediums such as solid-state memories, optical media, and magnetic media.

Systems, methods, and machine-readable media for initiating a recovery mode to execute a recovery mode procedure is provided. The system may include a main processor, an embedded controller, timer circuitry, and recovery circuitry. The timer circuitry may be configured to shut off the embedded controller for a first time period, wherein when the first time period expires, the embedded controller is further configured to boot from embedded controller recovery code. The timer circuitry may also be configured to shut off the main processor for a second time period, wherein when the second time period expires, the main processor may be configured to boot from main processor recover code and execute the recovery mode procedure. The recovery circuitry may be configured to receive an indication to execute the recovery mode procedure and, in response to receiving the indication to execute the recovery mode procedure, to trigger the first time period and the second time period.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system for initiating a recovery mode to execute a recovery mode procedure, the system comprising:
   a main processor;
   a embedded controller;
   recovery circuitry configured to receive an indication to execute a recovery mode procedure and, in response to receiving the indication to execute the recovery mode procedure, to trigger a first time period and a second time period; and
   timer circuitry configured to:
      shut off the embedded controller for the first time period, wherein when the first time period expires, the embedded controller is further configured to boot from embedded controller recovery code, and
      shut off the main processor for the second time period, wherein when the second time period expires, the main processor may be configured to boot from main processor recovery code and execute the recovery mode procedure.

2. The system of claim 1, wherein the recovery circuitry comprises a recovery button and the indication to execute the recovery mode procedure comprises a user activating the recovery button.

3. The system of claim 1, wherein the embedded controller is configured to control the power supply to the main processor.

4. The system of claim 1, wherein the timer circuitry is configured to shut off the embedded controller and the main processor using one or more control signals.

5. The system of claim 4, wherein the control signals comprise a embedded controller power override signal and a main processor power override signal.

6. The system of claim 1, wherein the recovery circuitry is further configured to activate a recovery signal in response to receiving the indication to execute the recovery mode procedure.

7. The system of claim 6, wherein:
the embedded controller is configured to detect the recovery signal and, based on detecting the recovery signal, boot from embedded controller recovery code; and
the main processor is configured to detect the recovery signal and, based on detecting the recovery signal, boot from main processor recovery code.

8. The system of claim 1, wherein the first time period and the second time period begin at the same time.

9. The system of claim 1, wherein the second time period is longer than the first time period.

10. The system of claim 1, wherein the timer circuitry is further configured to reboot the embedded controller and the main processor in a normal mode after the recovery mode procedure is executed.

11. The system of claim 1, wherein the main processor is a reduced instruction set computing (RISC) processor.

12. A method for initiating a recovery mode to execute a recovery mode procedure, the method comprising:
receiving a signal to execute a recovery mode procedure;
shutting off, using timer circuitry, an embedded controller for a first time period in response to receiving the signal, wherein when the first time period expires, the embedded controller is further configured to boot from embedded controller recovery code; and
shutting off, using the timer circuitry, a main processor for a second time period, wherein when the second time period expires, the main processor may be configured to boot from main processor recovery code and execute the recovery mode procedure.

13. The method of claim 12, wherein the signal to execute the recovery mode procedure comprises an activation of a recovery button by a user.

14. The method of claim 12, further comprising:
booting up the embedded controller from the embedded controller recovery code at the end of the first time period,
wherein booting up the embedded controller from embedded controller recovery code comprises powering on the embedded controller, detecting the signal to execute the recovery mode procedure, and booting up the embedded controller from embedded controller recovery code in response to detecting the signal.

15. The method of claim 12, further comprising:
booting up the main processor from the main processor recovery code at the end of the second time period; and
executing the recovery mode procedure,
wherein booting up the main processor from main processor recovery code comprises powering on the main processor, detecting the signal to execute the recovery mode procedure, and booting up the main processor from main processor recovery code in response to detecting the signal.

16. The method of claim 12, wherein the first time period and the second time period begin at the same time.

17. The method of claim 12, wherein the second time period is longer than the first time period.

18. The method of claim 12, further comprising rebooting the embedded controller and the main processor in a normal mode after the recovery mode procedure is executed.

19. The method of claim 12, further comprising displaying a recovery interface to a user after booting up the main processor from main processor recovery code.

20. A non-transitory machine-readable medium comprising instructions stored therein, which when executed by a machine, cause the machine to perform operations comprising:
receiving an indication to execute a recovery mode procedure;
shutting off, using timer circuitry and in response to receiving the indication, an embedded controller for a first time period, wherein when the first time period expires, the embedded controller is further configured to boot from embedded controller recovery code; and
shutting off, using the timer circuitry, a main processor for a second time period, wherein when the second time period expires, the main processor may be configured to boot from main processor recovery code and execute the recovery mode procedure.

* * * * *